May 17, 1960

C. S. SNYDER 2,937,264

ILLUMINATED SPIRIT LEVEL

Filed Aug. 2, 1956

*CHARLES S. SNYDER*
INVENTOR.

BY *David Rabin*
ATTORNEY

United States Patent Office 2,937,264
Patented May 17, 1960

2,937,264
ILLUMINATED SPIRIT LEVEL
Charles S. Snyder, Winston-Salem, N.C.

Application August 2, 1956, Serial No. 601,749

2 Claims. (Cl. 240—6.44)

This invention relates to spirit levels and more particularly to a spirit level combination in which a single spirit bubble may be illuminated by means of a removable flashlight unit.

Frequently pipe-pitters, plumbers, steel construction fabricators, carpenters and others are required to work in poorly illuminated locations making it extremely difficult for the worker to determine the accuracy of his work due to insufficient lighting facilities. Although for the most part a worker is able to perform the manual requirements of the task in poorly lighted areas, he is not able to determine the horizontality and verticality of the structural members which he may be fabricating. The prior art teaches the application of a source for illuminating the spirit bubble in a level, such as U.S. Letters Patent Nos. 948,570, 1,780,253, 1,193,976, 2,205,733, and 2,695,949, in each instance, however the level is constructed for supporting the requisite units within the interior of the level.

Therefore, it is an object of this invention to provide a flashlight in combination with a spirit level wherein the spirit level may have at least one aperture for admitting light rays from the flashlight into an area adjacent to the spirit bubbles or tubes.

Another object of this invention is the provision of a spirit level having a socket for accommodating a replaceable flashlight for illuminating individual bubble tubes in the level.

Still another object of this invention is to provide a spirit level having a plurality of level indicating stations with a flashlight supporting socket for releasably supporting a flashlight therein whereby the flashlight may illuminate the individual level indicating stations.

Yet another object of this invention is to provide a light, durable spirit level in which one or more individual replaceable flashlight units may be mounted for illuminating the level indicating tubes.

Still another object of this invention is to provide an inexpensive spirit level with interchangeable illuminating means which may be refurnished when exhausted, one which has a minimum number of component elements, and one which is simple to construct with the operating elements readily accessible.

Other and further objects and many of the attendant advantages will become more readily apparent as the invention becomes better understood from the following detailed description taken in conjunction with the accompanying drawing in which like characters of reference designate corresponding parts throughout the several views and where:

Figure 1:
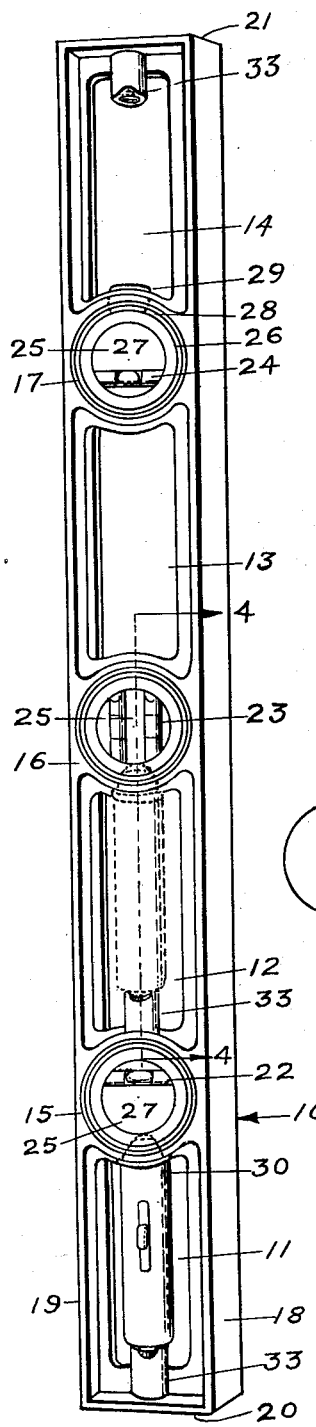
Fig. 1 is a front elevational perspective view of a spirit level of the present invention having in combination therewith replaceable bubble illuminating means in one location and illustrating, in dotted outline, the illuminating means in another location.
Figure 2:
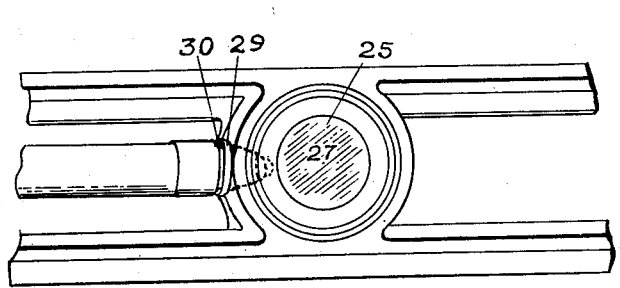
Fig. 2 is an enlarged perspective view of a single indicating position of a level with the level indicating means removed therefrom.
Figure 3:
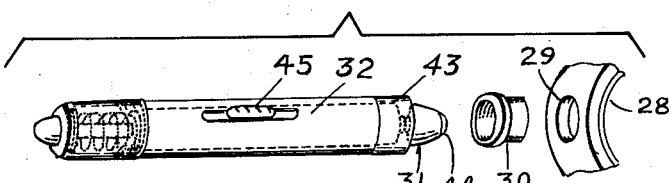
Fig. 3 is an exploded view of a miniature flashlight assembly, a flashlight hub adapter and a portion of the level indicating station rim.
Figure 4:
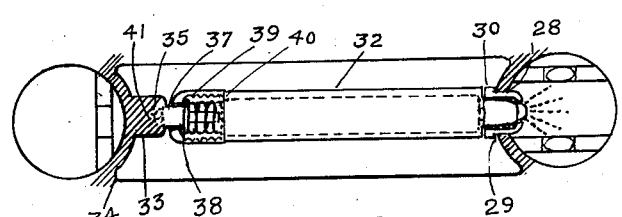
Fig. 4 is an enlarged transverse sectional view of a portion of a spirit level taken substantially along the plane of line 4—4 of Fig. 1.

Referring to the drawing there is broadly shown a preferred embodiment of the inventive concept which comprises a spirit level framework 10 having illuminating means which level framework is preferably made of a metal casting in order to provide a plurality of longitudinal openings 11, 12, 13 and 14 which are spaced axially from each other sufficiently to accommodate the level indicating stations or sight openings 15, 16 and 17 therebetween. The sides 18 and 19 and ends 20 and 21 of the level are machined to present level surfaces for cooperative relation with the spirit level liquid containing tubes 22, 23 and 24 mounted within the sight openings 15, 16 and 17, respectively.

The spirit level sight openings 15, 16 and 17 may be fabricated assemblages which consist of a circular metallic hub 26 provided with a central aperture 25 which is covered by glass or a transparent plastic material 27. The level indicating bubble tubes 22, 23 and 24 are securely mounted within the metallic hub to eliminate any relative movement. Each of these assemblages may be readily replaced upon breakage by removing the broken unit and inserting a replacement unit therein.

A circular aperture 28 is provided in each hub 26 which will register with an opening or passageway 29 in the side of the sight openings to receive securely therein the adapter sleeve 30. Adapter sleeve 30 may be made of rubber or other resilient material to fit snugly about the illuminating end 31 of the flashlight 32.

In axial alignment with each of the apertures 28 and passageways 29 is a boss or projection 33. The boss 33 is usually mounted on the rib structure 34 within the flashlight chamber or openings 11, 12, 13 or 14. The crown of the boss 33 is preferably countersunk to provide a socket 35 of sufficient radius and depth to receive and support therein the yieldable base end or projection 37 of the flashlight 32. It will be readily apparent that the reach between an aperture 29 and the base of the boss 35 will be such as to accommodate a small conventional single-cell flashlight 32 therebetween.

The single dry-cell flashlight 32 may be of the standard miniature type with several modifications provided thereto. At the base end of the flashlight 32, an opening 38 in the screw cap 39 is provided through which the projection 37 may pass for engagement into the socket 35 of the boss 33. The projection 37 is urged outwardly constantly by means of the coil spring 40 or other suitable spring means which is compressed as the flashlight is positioned between the aperture 29 in the sight opening wall and the boss 33. Obviously, by providing a suitable radius or chamfered edge on the boss 33, the rounded tip 41 on the projection 37 may be inserted or removed from the socket 35 by merely exerting a non-axial pull or push on the base end of the flashlight sufficient to dislodge the tip 35 from within the socket recess. By displacing the base end of the flashlight 32 out of the socket and to one side, the other end may be withdrawn from the adapter sleeve 30.

The illuminating end 31 of the flashlight 32 which is inserted into the adapter sleeve is provided with a cap 43 through which the flashlight bulb 44 may extend for projection into the adapter sleeve 30 and the aperture 29 and the opening 28. A conventional slide switch 45 on the flashlight, when actuated, will make or break the circuit to turn the bulb on or off. A conventional miniature dry-cell is inserted in the housing and may be readily replaced merely by disconnecting the base 39 or the cap 43 from the flashlight housing.

Although several flashlight units may be accommodated in each spirit level, one at each station, this is not necessary as a single flashlight assembly may be shifted from one position to another with relative ease depending upon whether horizontality or verticality is to be checked. Also, the flashlight may be removed from its normal position in the level for separate illuminating purposes.

In some applications of this invention it has been found desirable to enclose the flashlight housing within a waterproof casing, particularly when the level is used in inclement weather or in damp or wet places in order to prolong dry-cell life.

Obviously, many modifications and variations may be made in the form of the spirit level to accommodate a replaceable flashlight assemblage in the light of the above teachings without departing from the real purpose and spirit of this invention. It is, therefore, to be understood that within the scope of the appended claims many modified forms of the present inventive concept as well as the use of mechanical equivalents may be reasonably included and modifications are contemplated.

What is claimed is:

1. A spirit level comprising, in combination, a level having a surface for determining horizontal linearity and a surface for determining vertical linearity, said level also having longitudinally extending openings and intermediate sight openings therein, each of said sight openings containing a spirit bubble tube, each of said longitudinally extending openings having a flashlight receiving socket including at one end an axially extending boss having a recess therein, said sight openings having a passageway extending axially to communicate with the longitudinal opening, a flashlight having an overall length reaching between the boss and said passageway, one end of said flashlight having a resilient axially extending projection for releasable reception into the recess of said boss whereby the flashlight may be replaceably mounted in the socket or removed to another opening.

2. A spirit level comprising, in combination, a level framework having transverse sight openings therethrough, a spirit bubble tube mounted in each of the sight openings, said framework having flashlight receiving openings therein in juxtaposition to the sight openings, and a boss in spaced relation to each of said sight openings, said boss having a projection receiving recess therein, each of said flashlight receiving openings having a passageway in the framework communicating with the sight openings, and a flashlight assemblage including a casing, a dry-cell, a bulb and means for opening and closing a circuit to supply energy to the bulb releasably supported in the flashlight receiving opening with the bulb projecting into said passageway, and a resiliently supported projection extending axially from one end of the flashlight for releasable reception into the boss recess for retaining the flashlight in position.

References Cited in the file of this patent

UNITED STATES PATENTS

| | | |
|---|---|---|
| 953,425 | Miller | Mar. 29, 1910 |
| 2,543,572 | Friberg | Feb. 27, 1951 |
| 2,652,481 | Hall | Sept. 15, 1953 |
| 2,777,940 | Spiro et al. | Jan. 15, 1957 |